(12) United States Patent
Su

(10) Patent No.: US 10,194,114 B1
(45) Date of Patent: Jan. 29, 2019

(54) SPLIT SCREEN DISPLAY WITHOUT DISTORTION

(71) Applicant: Polycom, Inc., San Jose, CA (US)

(72) Inventor: Wei-Cheng Su, Austin, TX (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 16/016,434

(22) Filed: Jun. 22, 2018

(51) Int. Cl.
*G06T 3/00* (2006.01)
*G06T 5/00* (2006.01)
*G06T 5/50* (2006.01)
*H04N 7/14* (2006.01)
*H04N 7/15* (2006.01)
*H04N 5/232* (2006.01)
*H04N 5/445* (2011.01)

(52) U.S. Cl.
CPC ....... *H04N 5/44591* (2013.01); *G06T 3/0062* (2013.01); *G06T 5/006* (2013.01); *G06T 5/50* (2013.01); *H04N 5/23238* (2013.01); *H04N 7/147* (2013.01); *H04N 7/15* (2013.01); *G06T 2207/20212* (2013.01)

(58) Field of Classification Search
CPC combination set(s) only.
See application file for complete search history.

(56) References Cited

U.S. PATENT DOCUMENTS

| | | | |
|---|---|---|---|
| 2009/0033737 A1* | 2/2009 | Goose | G06F 3/0481 348/14.07 |
| 2010/0195716 A1* | 8/2010 | Klein Gunnewiek | H04N 19/597 375/240.08 |
| 2010/0329358 A1* | 12/2010 | Zhang | H04N 19/597 375/240.26 |
| 2016/0021367 A1* | 1/2016 | Yoon | H04N 13/324 13/324 |
| 2016/0187745 A1* | 6/2016 | Jin | G02F 1/134336 349/110 |
| 2017/0324921 A1* | 11/2017 | Yan | G09G 5/00 |

* cited by examiner

*Primary Examiner* — Phung-Hoang J Nguyen
(74) *Attorney, Agent, or Firm* — Blank Rome, LLP

(57) ABSTRACT

A system for displaying images captured with a wide view lens in a split view without distortion. The system captures raw image data using the wide view lens and renders it to projection plane corresponding to a curved display surface, and then maps the image data from the projection plane to a rectilinear display screen, thereby eliminating all distortion in the displayed image regardless of the angle of view of the lens.

19 Claims, 8 Drawing Sheets

950

```
for each (x_p, y_p) in Image_rectilinear (x_c, y_c) = map_from_rectilinear_to_cylindrical(x_p, y_p)

Pixel = interpolate_from_neighbors(x_c, y_c, Image_cylindrical)

Image_rectilinear(x_p, y_p) = Pixel
```

```
for each (x_c, y_c) in Image_cylindrical (x_p, y_p) = map_from_cylindrical_to_rectilinear(x_c, y_c)

Pixel = interpolate_from_neighbors(x_p, y_p, Image_rectilinear_source)

Image_cylindrical(x_c, y_c) = Pixel for each (x_p, y_p) in Image_rectilinear_target (x_c, y_c) = map_from_rectilinear_to_cylindrical(x_p, y_p)

Pixel = interpolate_from_neighbors(x_c, y_c, Image_cylindrical)

Image_rectilinear_target(x_p, y_p) = Pixel
```

FIG. 9D

SPLIT SCREEN DISPLAY WITHOUT DISTORTION

TECHNICAL FIELD

This disclosure relates to video processing, and more particularly to presenting a plurality of views captured in a videoconferencing setting in such a way as to minimize distortion amongst the views.

BACKGROUND

In videoconferencing a single camera, such as a wide angle camera or panoramic camera, can be used to capture a view feed containing multiple meeting participants, (a "room view"). A copy of the captured feed can be cropped to contain an enlarged view of a single person (such as a person who has been talking for a while) or group of persons at an endpoint. Another copy of the captured feed can be cropped to contain someone (or something) else, for example, a person who was speaking before the person in first copy. The cropped view from the first copy and the cropped view from the second copy of the feed can then be displayed in a split view on a single display surface, such as a video monitor. The individual views, being based on data captured by a curved lens, will be distorted when displayed on a flat surface. Thus, there is room for improvement in the art.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings:

FIG. 9C illustrates code for projecting an image from a cylindrical plane to a rectilinear plane, in accordance with an embodiment of this disclosure.

FIG. 9D illustrates a code for projecting from a first rectilinear plane to a second rectilinear plane, in accordance with an embodiment of this disclosure.

DETAILED DESCRIPTION

Figure 1:
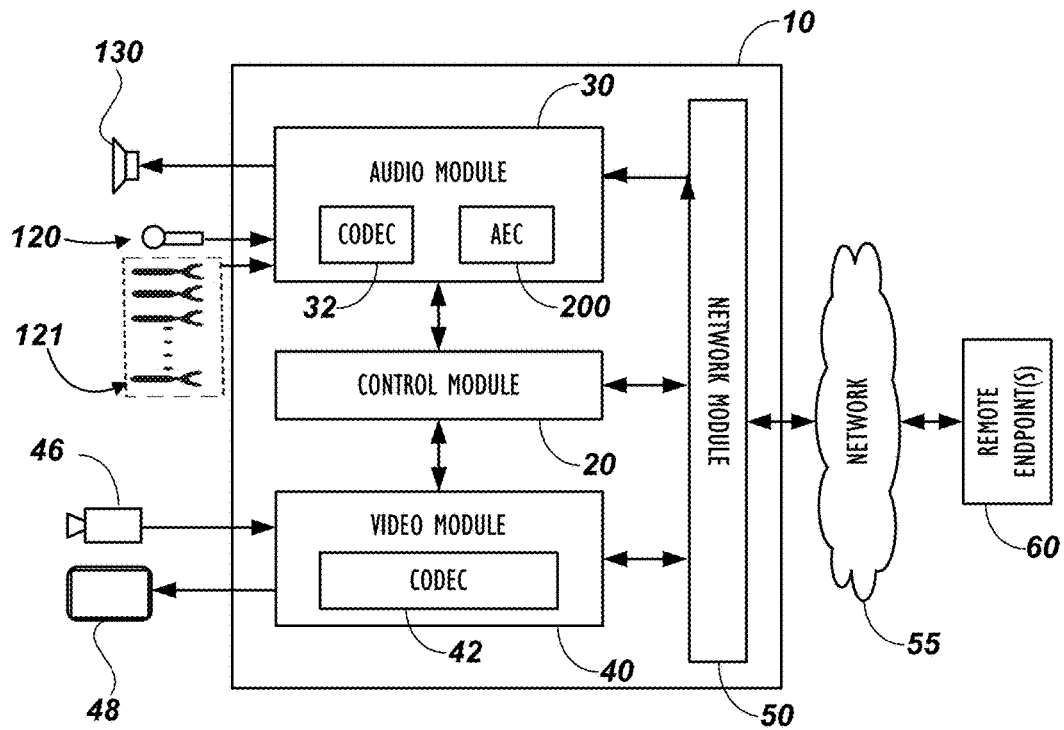
FIG. 1 illustrates an operational environment of embodiments of this disclosure.

In the drawings and the description of the drawings herein, certain terminology is used for convenience only and is not to be taken as limiting the embodiments of the present disclosure. In the drawings and the description below, like numerals indicate like elements throughout.

DESCRIPTION OF TERMS

The following terms have the following meanings, unless indicated otherwise. Raw data refers to image data captured by a camera device. A projection plane refers to a virtual image. A projection plane refers to data information which would be suitable for display on a display screen. A projection plane is normally stored as a frame buffer, which involves storing digital data on a pixel by pixel basis for a display which is height by width pixels. The data stored in a frame buffer can include digitized data which is based on raw data. A projection plane (that is, its data) can be scaled to correspond to a different projection plane, and/or scaled to a real (not virtual) display surface.

As noted above, it is possible to generate a split view by cropping meeting attendees out of a full image and creating a composite showing them side by side. The full image from which the individual views drawn can be from a panoramic camera or wide-angle camera. The lenses of these types of cameras can produce pronounced distortions. Split view images composited from cropped panoramic views tend to have warped lines, whereas wide-angle cameras produce images having conspicuous perspective distortion close to their edges. That is, distortion associated with displaying image data captured with a wider view lens becomes more pronounced the further one goes from image center. The artifacts of these distortions, when captured images are displayed, can be less disconcerting or noticeable if the display surface has a curvature which mimics that produced by the lens of the capturing camera. To this end, imaging from panoramic cameras can be projected onto a cylindrical surface (a/la/, use cylindrical projection) to form a continuous image of 360 degrees or 180 degrees; imaging from panoramic cameras can be projected onto a curved surface. However, displaying on a non-flat surface is not always an option, and can be costly. Moreover, any lack of symmetry between the individual (e.g., left and right) views or their subjects (e.g., distance of attendee from camera, horizontal space between depicted attendee and sides of displayed area), will cause the inherent distortions to become all the more noticeable and distracting, thereby decreasing the quality of the user experience.

Embodiments of this disclosure pertain to generating split view images with minimal or no distortion. In at least one embodiment, this is done by "pre-projecting" each of the cropped windows onto an intermediate plane before compositing them into a split view image. As will be explained in greater detail below, pre-projection can be virtual. That is, aspects of the pre-projection process can be modeled mathematically. Additionally, appropriate calibration of equipment and creation of look up tables based on the physical configurations of endpoints and videoconferencing rooms can be utilized to reduce computation time, enabling a split view without distortion to be created in real-time.

FIG. 1 illustrates a possible operational environment for example circuits of this disclosure. Specifically, FIG. 1 illustrates a conferencing apparatus or endpoint 10 in accordance with an embodiment of this disclosure. Conferencing apparatus or endpoint 10 of FIG. 1 communicates with one or more remote endpoints 60 over a network 55. The endpoint 10 includes an audio module 30 with an audio codec 32, and a video module 40 with a video codec 42. These modules 30/40 operatively couple to a control module 20 and a network module 50. In implementations of the technology which only involve audio communication, video module 40 with a video codec 42 can be omitted.

A microphone 120 captures audio and provides the audio to the audio module 30 and codec 32 for processing. The microphone 120 can be a table or ceiling microphone, a part of a microphone pod, an integral microphone to the endpoint, or the like. Additional microphones 121 can also be provided. Throughout this disclosure all descriptions relating to microphone 120 apply to any additional microphones 121, unless otherwise indicated. The endpoint 10 uses the audio captured with the microphone 120 primarily for the conference audio. In general, the endpoint 10 can be a conferencing device, a videoconferencing device, a personal computer with audio or video conferencing abilities, or any similar type of communication device. If the endpoint 10 is used for videoconferencing, a camera 46 captures video and provides the captured video to the video module 40 and codec 42 for processing.

After capturing audio and video, the endpoint 10 encodes it using any of the common encoding standards, such as MPEG-1, MPEG-2, MPEG-4, H.261, H.263 and H.264. Then, the network module 50 outputs the encoded audio and video to the remote endpoints 60 via the network 55 using any appropriate protocol. Similarly, the network module 50 receives conference audio and video via the network 55 from the remote endpoints 60 and sends these to their respective codec 32/42 for processing. Eventually, a loudspeaker 130 outputs conference audio (received from a remote endpoint), and a display 48 can output conference video.

The endpoint 10 further includes an acoustic echo cancellation module 200 that reduces acoustic echo. Acoustic echo results from far-end audio output by the loudspeaker 130 being subsequently picked up by the local microphone 120, reprocessed, and sent back to the far-end. Additional microphones 121 can operate by the same principle. The acoustic echo cancellation module (200) can be based on acoustic echo cancellation techniques known and used in the art to reduce or eliminate this form of echo.

Figure 2:
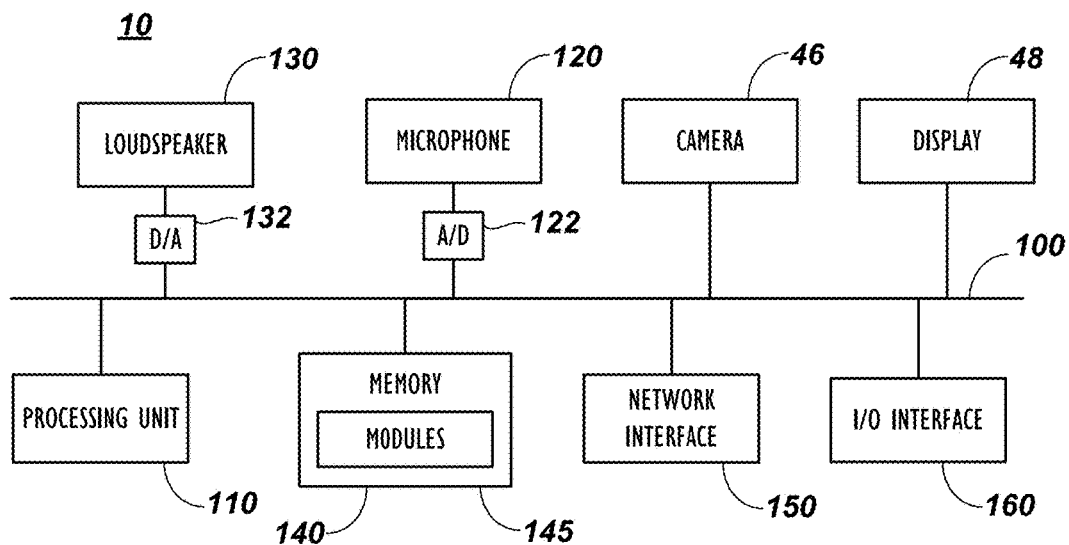
FIG. 2 illustrates components of the operational environment of FIG. 1.

FIG. 2 illustrates components of the conferencing endpoint of FIG. 1 in detail. The endpoint 10 has a processing unit 110, memory 140, a network interface 150, and a general input/output (I/O) interface 160 coupled via a bus 100. As above, the endpoint 10 has the base microphone 120 and loudspeaker 130 and can have the video components of a camera 46 and a display 48 if desired.

The memory 140 can be any conventional memory such as SDRAM and can store modules 145 in the form of software and firmware for controlling the endpoint 10. The stored modules 145 include the various video and audio codecs 32/42 and other modules 20/30/40/50/200 discussed previously. Moreover, the modules 145 can include operating systems, a graphical user interface (GUI) that enables users to control the endpoint 10, and other algorithms for processing audio/video signals.

The network interface 150 provides communications between the endpoint 10 and remote endpoints (60). By contrast, the general I/O interface 160 can provide data transmission with local devices such as a keyboard, mouse, printer, overhead projector, display, external loudspeakers, additional cameras, microphones, etc.

During operation, the loudspeaker 130 outputs audio in the conference environment. For example, this output audio can include far-end audio received from remote endpoints via the network interface 150 and processed with the processing unit 110 using the appropriate modules 145. At the same time, the microphone 120 captures audio in the conference environment and produces audio signals transmitted via the bus 100 to the processing unit 110.

For the captured audio, the processing unit 110 processes the audio using algorithms in the modules 145. In general, the endpoint 10 processes the near-end audio captured by the microphone 120 and the far-end audio received from the transmission interface 150 to reduce noise and cancel out acoustic echo that may occur between the captured audio. Ultimately, the processed audio can be sent to local and remote devices coupled to interfaces 150/160. In particular, the endpoint 10 uses the acoustic echo canceller 200 of FIG. 1 that can operate on the signal processor 110. The acoustic echo canceller 200 removes the echo signal from captured near-end signal that may be present due to the loudspeaker 130 in the conference environment.

As shown in FIG. 2, the microphone 120 uses an analog-to-digital (ADC) converter 122. The loudspeaker 130 uses a digital-to-analog (DAC) converter 132. When attempting to ameliorate the effects of distortion in the loudspeaker 130 audio, digital and analog gain of each component may need to be taken into account. The audio processing circuit (300) discussed below can serve to minimize noise in audio captured by microphone 120. Cameras with speaker tracking capability find the current speaker and either point the camera to the speaker or zoom in to the speaker.

However, there are cases when it is undesirable to solely display a current speaker, such as when two people are talking to each other. In that case, it is more natural to show the two people simultaneously in a split view, such as that illustrated in FIG. 3.

Figure 3:
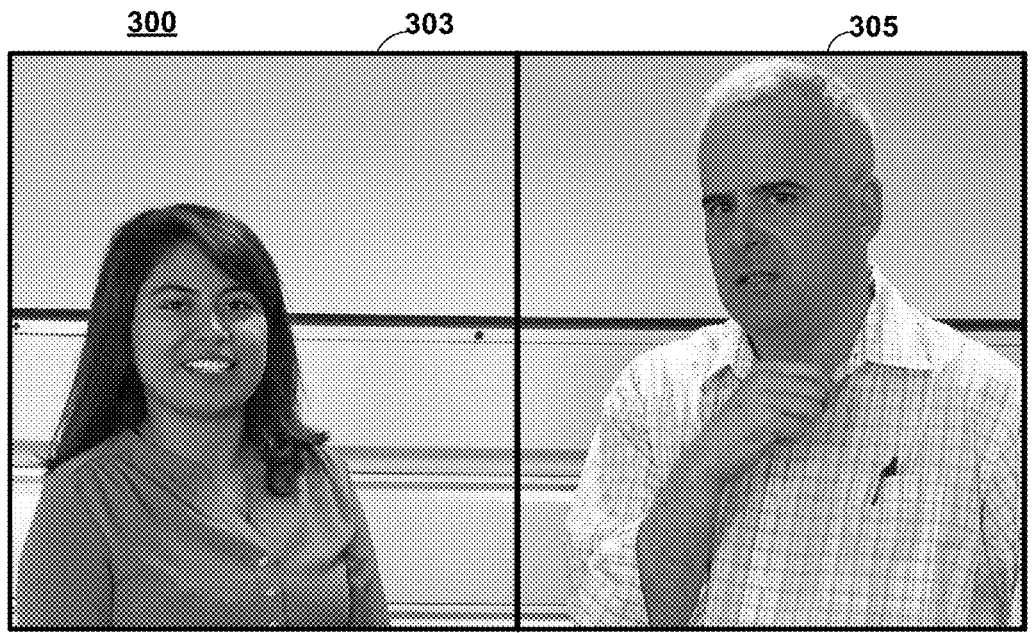
FIG. 3 illustrates a split view rendering, in accordance with an embodiment of this disclosure.

FIG. 3 illustrates a split view 300 with a first person 307 in a first window 303 on the left, and a second person 309 in a second window 305 on the right. In this idealized split view 300, there is no distortion in either the left side view 303 or the rightward view 305. (Note, although the embodiments discussed herein refer to a split view having two sections, the inventive concepts described are applicable to situations where a greater number of views is desirable.)

Figure 4:
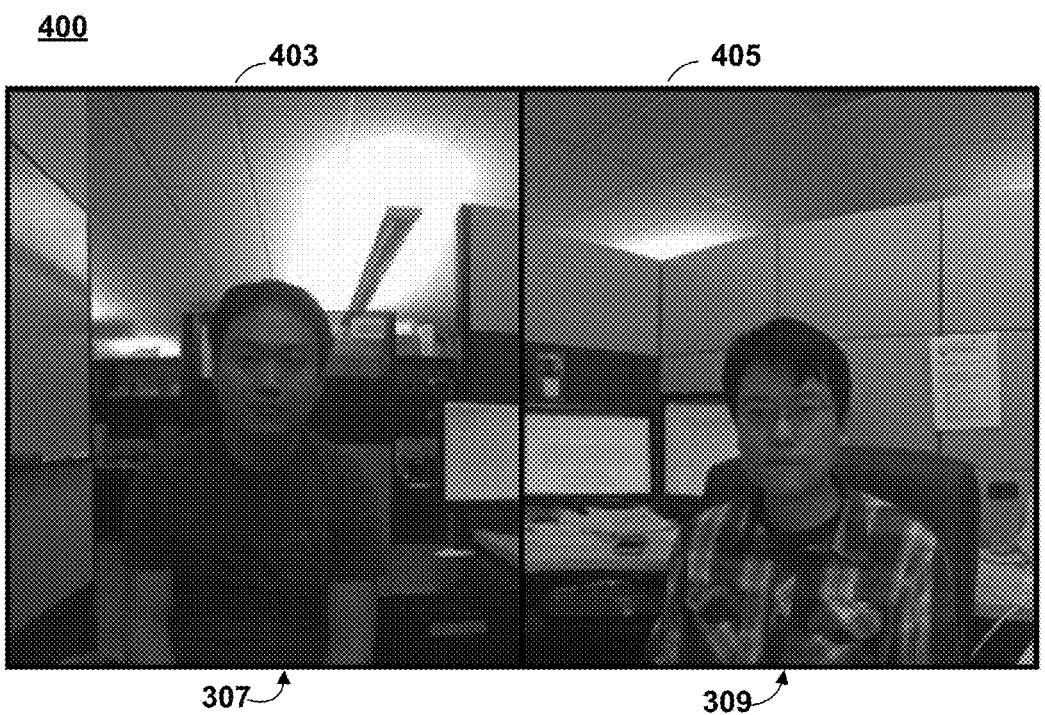
FIG. 4 illustrates a split view formed from a panorama, in accordance with an embodiment of this disclosure.

FIG. 4 illustrates a split view 400 composited of views 403, 405 cropped from a panoramic view. Although the person 307 in leftward view 403 and the person 309 in the rightward view 405 are themselves substantially undistorted, the lineage in the upper portions of both views 403, 405 is noticeably warped.

Figure 5:
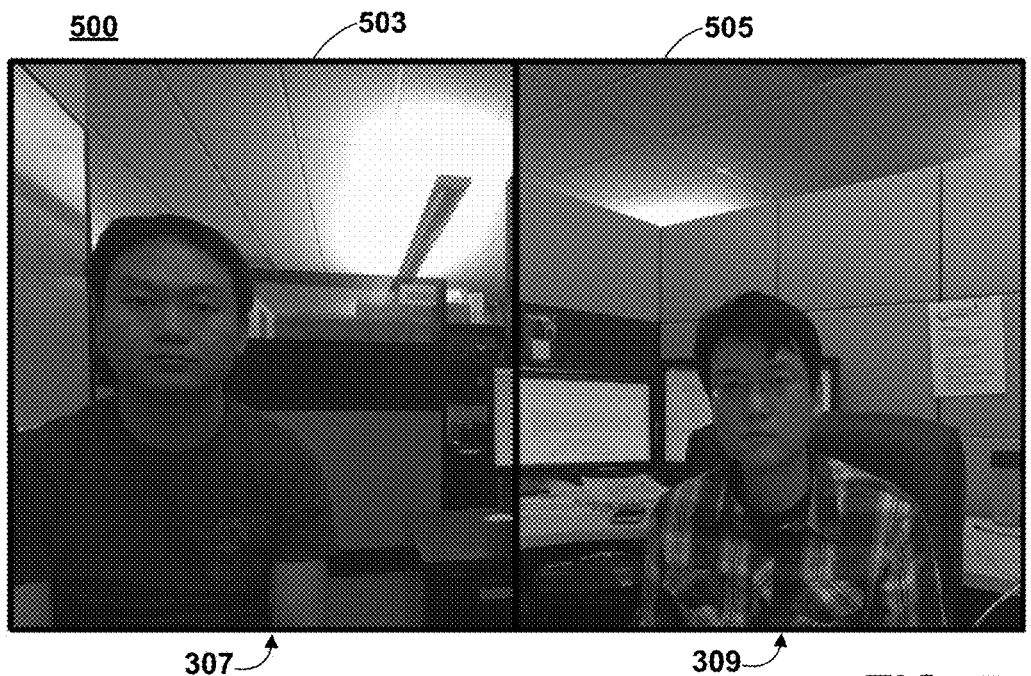
FIG. 5 illustrates a split view formed from a wide-angle image, in accordance with an embodiment of this disclosure.

FIG. 5 shows an example of a split view 500 composited of views 503, 505 cropped from a wide-angle image. While the view 505 on the right containing person 309 seems substantially correct, on the left side 503, person 307 is close to the edge and perspective distortion causes him to appear look wide and stretched.

Figure 6:
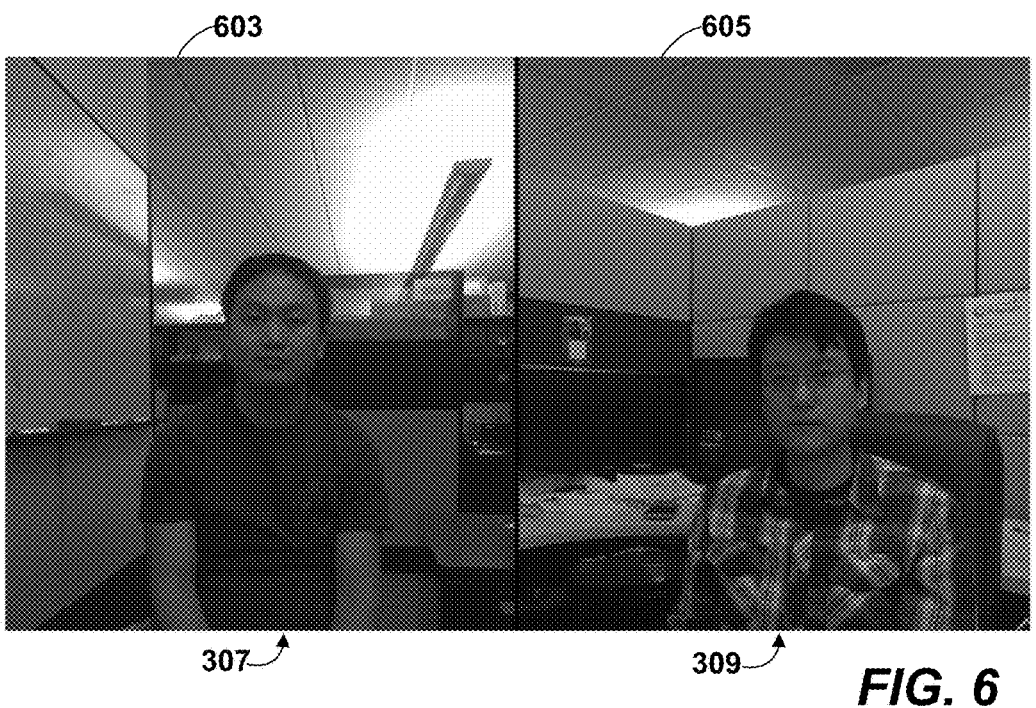
FIG. 6 illustrates a split view without distortion, in accordance with an embodiment of this disclosure.

FIG. 6 illustrates a split view 600 containing virtually no distortions, in accordance with an embodiment of this disclosure. Neither the left side view 603 containing person 307 nor the right side view 605 containing person 309 has any portions which are noticeably warped. This undistorted split view 600 can be achieved using methods described herein, such as by pre-projecting the image depicted in the left view 603 and the image depicted in the right view 605 to a plane perpendicular to the directions of the captured images.

Figure 7:
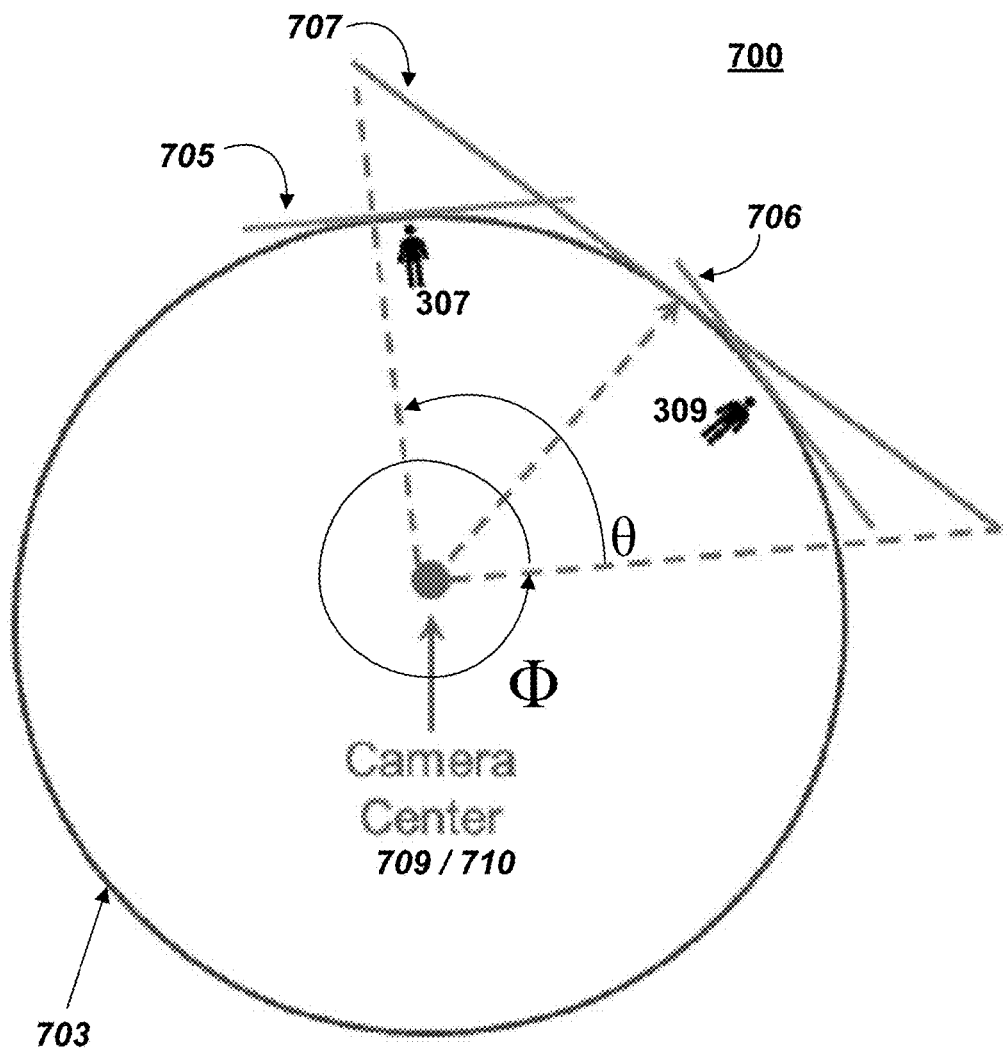
FIG. 7 illustrates a top plan view of projection planes used in methods of this disclosure.

FIG. 7 illustrates a top plan view 700 of projection planes 703, 705, 706, and 707 used in different methods of this disclosure. The angular field of view Φ of a panoramic camera 709 is normally 180 to 360 degrees. Panoramic images are formed by projecting image data captured by a panoramic camera 709 onto a cylindrical surface 703 before being projected onto rectangular surfaces 705 and 706.

Image data captured with a wide-angle camera 710 is pre-projected onto rectilinear surface 707 before it is projected to rectangular surfaces 705 and 706. Thus, FIG. 4 is generated by compositing cropped segments of cylinder 703 containing person 307 and person 309. FIG. 5 is generated by compositing cropped segments of plane 707 containing person 307 and person 309. The optimized split view 600, as illustrated in FIG. 6, is generated by pre-projecting the cropped images from either the panoramic camera 709 or wide-angle camera 710 onto planes 705 and 706, and then compositing the two images 705, 706 and displaying them in a split view 300, 600.

Preparing an image for display on a first display and then preparing a second image for display on a second display based on the first image, can be computationally intensive. In at least one embodiment of this disclosure, the process of pre-projecting (or re-projecting) is combined with other image signal processing to reduce computational overhead. In at least one embodiment, lens distortion correction, image stitching, and re-projection are combined within a single stage.

Correcting for lens distortion correction and image stitching operations involve mapping points from input images to points in output images, that is, mapping captured data from a capture array onto an output array for rendering using a display device. Re-projection involves mapping points from a capture array to a projection array, and then mapping the projection array data onto an output (display) array. However, these mapping processes are different for different angular fields of view, (e.g., θ, α) and different display surfaces (devices). Because mapping computations can be computationally expensive, in at least one embodiment, re-projection maps for all possible angles are calculated and stored in advance. The re-projection maps are then combined with distortion correction maps and stitching maps.

Figure 8:
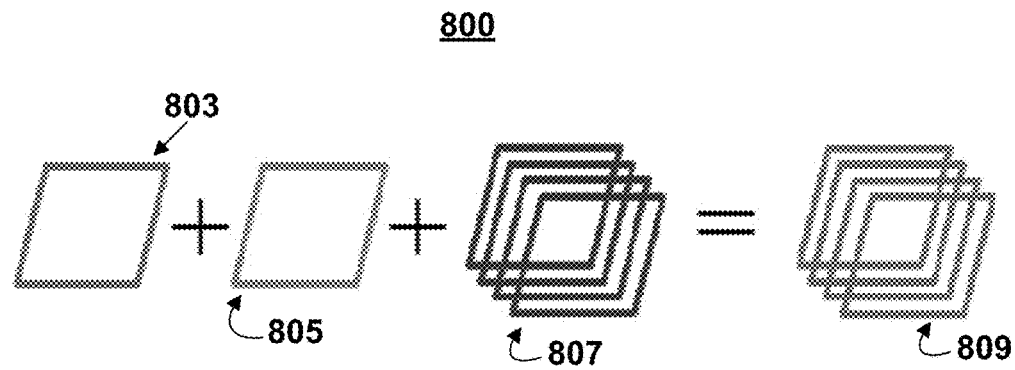
FIG. 8 a method in which distortion correction mapping, stitching mapping, and re-projection mapping are combined into a single distortion-free process.

At least one embodiment of this disclosure supports reproduction of image capture data for meeting participants seated at each integer angle. Thus 360 degree maps are generated during preprocessing. The process is illustrated in FIG. 8, in which distortion correction mapping 803, stitching mapping 805, and re-projection mapping are combined into a single distortion-free process 809. By virtue of the pre-computed maps 803, 805, 807 generating the optimized split view 600 is not substantially more computationally intensive than would be the case in capturing a single image using a narrow view lens for conventional display.

Mapping Between a Cylindrical Plane and a Rectilinear Plane

Figure 9A:
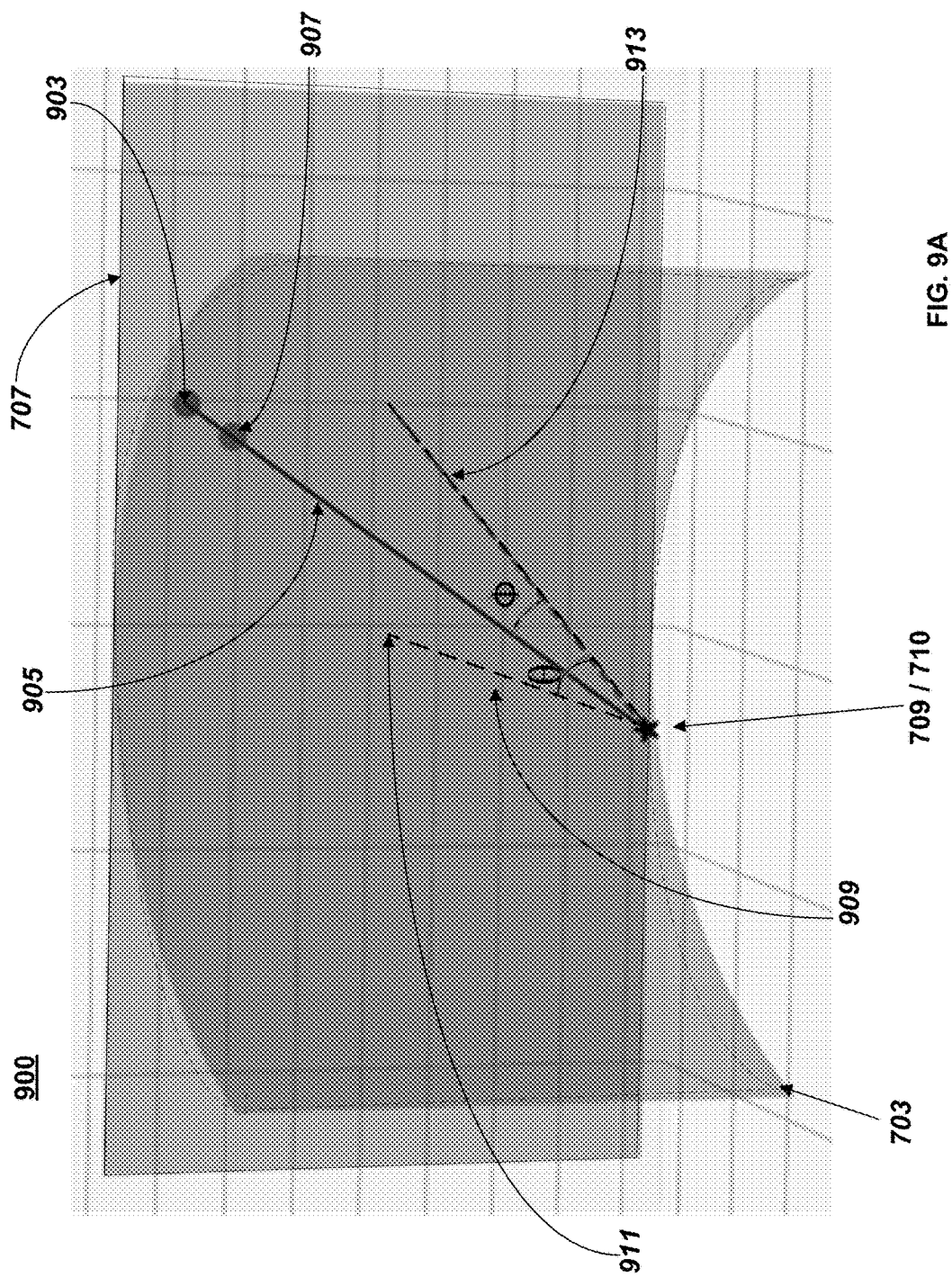
FIG. 9A illustrates a method of mapping image data from a cylindrical plane to a rectilinear plane.

FIG. 9A illustrates a method 900 of mapping image data from a cylindrical plane 703 onto a rectilinear plane 707. Point 903 is a point on the rectilinear plane 707. As in FIG. 7, camera 709, 710 is located at the angular center of angle θ forming cylindrical surface 703. Line segment 905 runs from camera 709, 710 to point 903 on rectilinear plane 707 and intersecting cylindrical plane 703 at point 907. The dashed line segment 909 runs from camera 709/710 to the center 911 of rectilinear plane 707 and the center of cylindrical plane 703. In other words, point 911 is the center of both the captured image (corresponding to the area covered by cylindrical plane 703) and the mapped display image (corresponding to rectilinear surface 707). The distance between camera 709/710 and cylindrical plane 703 is r (length of 909 from 709/710 to point 911). Line segment 913 is simply the projection of line segment 905 onto the horizontal plane formed by angle θ along cylindrical plane 703. The angle between line segment 913 and 909 is θ, and the angle between line segment 905 and line segment 913 is φ.

According to method 900, let the coordinate of the point 903 be $(x_p, y_p)$ and the coordinate of point 907 be $(x_c, y_c)$. This implies the following relationships, (angles are, of course, expressed in radians):

$$x_c = r * \theta$$

$$y_c = r * \tan \varphi$$

$$x_p = r * \tan \theta$$

$$y_p = \frac{r}{\cos \theta} \tan \varphi$$

Using the above four mathematical equations, any coordinate $(x_c, y_c)$ on cylindrical surface 703 can be determined for any given $(x_p, y_p)$ using the following two equations.

$$x_c = r * \tan^{-1}\left(\frac{x_p}{r}\right) \qquad (1)$$

$$y_c = y_p * \frac{r}{\sqrt{x_p^2 + r^2}} \qquad (2)$$

Similarly, a coordinate $(x_p, y_p)$ on planar surface 707 can be determined for any given $(x_c, y_c)$ coordinate on cylindrical surface 703 as follows:

$$x_p = r * \tan\left(\frac{x_c}{r}\right) \qquad (3)$$

$$y_p = \frac{y_c}{\cos\left(\frac{x_c}{r}\right)} \qquad (4)$$

In equations 1-4, r is determined by the width of the image in pixels and horizontal field of view θ. For example, if the original image is panoramic (i.e., captured with a panoramic camera) and is W pixels wide and is θ wide in radians (HFOV has a radial width of θ), then:

$$r = \frac{W}{HFOV} \qquad (5)$$

If the original image is rectilinear, then by implication:

$$r = \frac{W}{2 * \tan\left(\frac{HFOV}{2}\right)} \qquad (6)$$

To project a panoramic image to a rectilinear display—meaning $(x_p, y_p)$ is the destination and $(x_c, y_c)$ is the source—for every pixel ($x_p$, $y_p$) in the rectilinear image, equation (1) and (2) are used to find the corresponding pixel ($x_c$, $y_c$) in the panoramic image. When projecting from one plane to another, each destination pixel is filled by finding its corresponding source pixel location and using the data corresponding to the source pixel value (or interpolate the source pixel value) to fill the destination pixel. Thus, the pixel value at ($x_c$, $y_c$) in the panoramic image is used to fill the pixel ($x_p$, $y_p$) in the rectilinear image. If ($x_c$, $y_c$) is fractional, the pixel value for ($x_p$, $y_c$) is interpolated from nearby pixels on cylindrical surface 703.

In at least one embodiment of this disclosure, in order to project a rectilinear image to a rectilinear plane which has different dimensions and angles from the rectilinear image, the rectilinear image is first projected to a cylindrical plane 703. Thereafter, the image conforming to the cylindrical surface 703 is then projected onto a final rectilinear plane 705, 706.

Figure 9B:
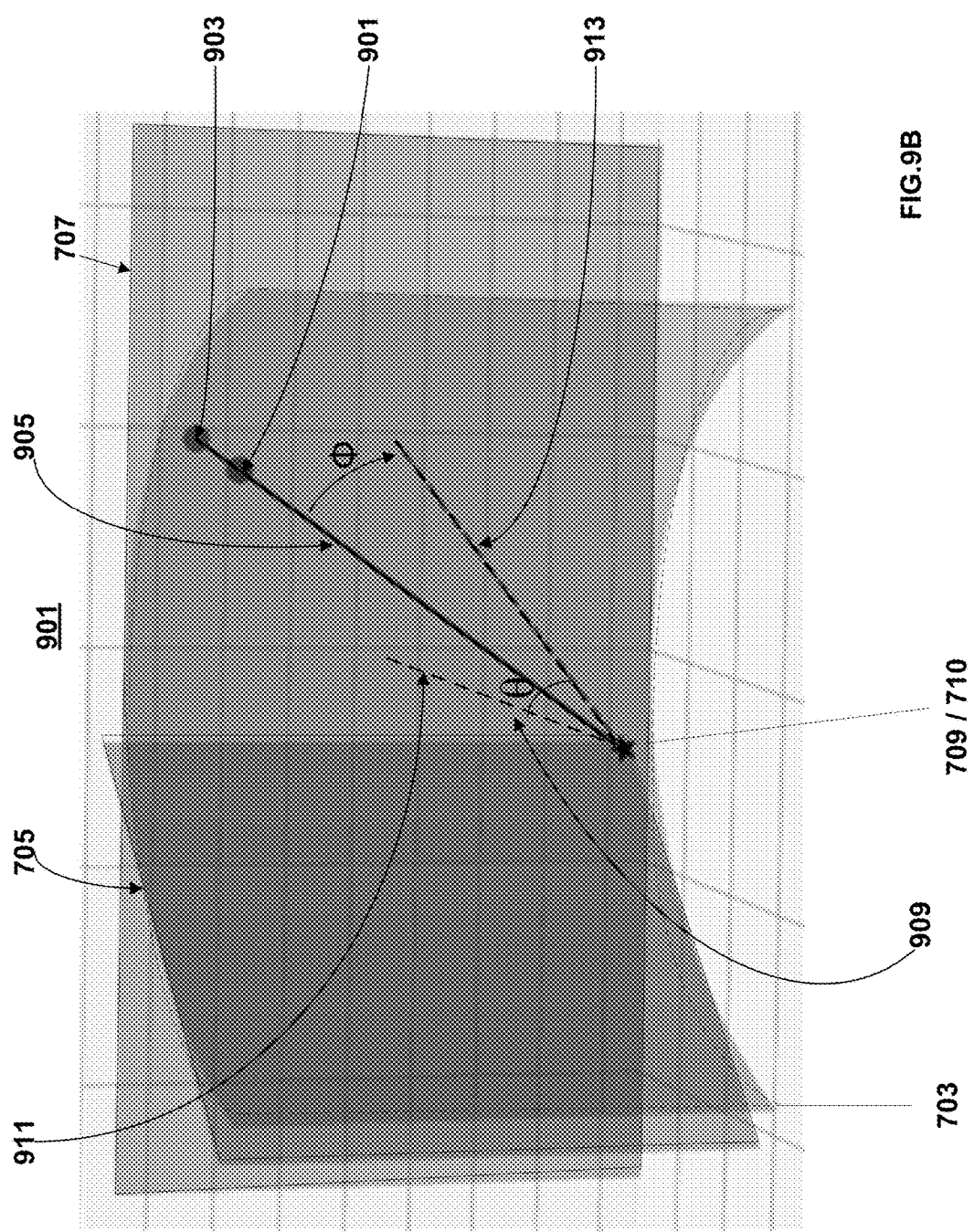
FIG. 9B illustrates a method of projecting a portion of a rectilinear image to a rectilinear plane which has different dimensions from the rectilinear image.

FIG. 9B illustrates a method of projecting a portion of a rectilinear image 707 to a rectilinear plane 705 which has different dimensions and angles from rectilinear image 707. Rectilinear image 707 is first projected to cylindrical plane 703 using equations (3) and (4). Thereafter, the leftward portion of the cylindrical image 703 is projected onto a rectilinear plane 705 using equations (1) and (2).

Example code 950 for projecting from a cylindrical plane 703 to a rectilinear plane 707 is illustrated in FIG. 9C. Example code 951 for projecting from a first rectilinear plane 707 to a second rectilinear plane 705 is illustrated in FIG. 9D. Code 951 projects to an intermediate cylindrical plane first and then projects to a subsequent final rectilinear plane. The two-step process described is presented in order to provide a clear explanation. In some embodiments, the two steps can be merged.

Figure 10:
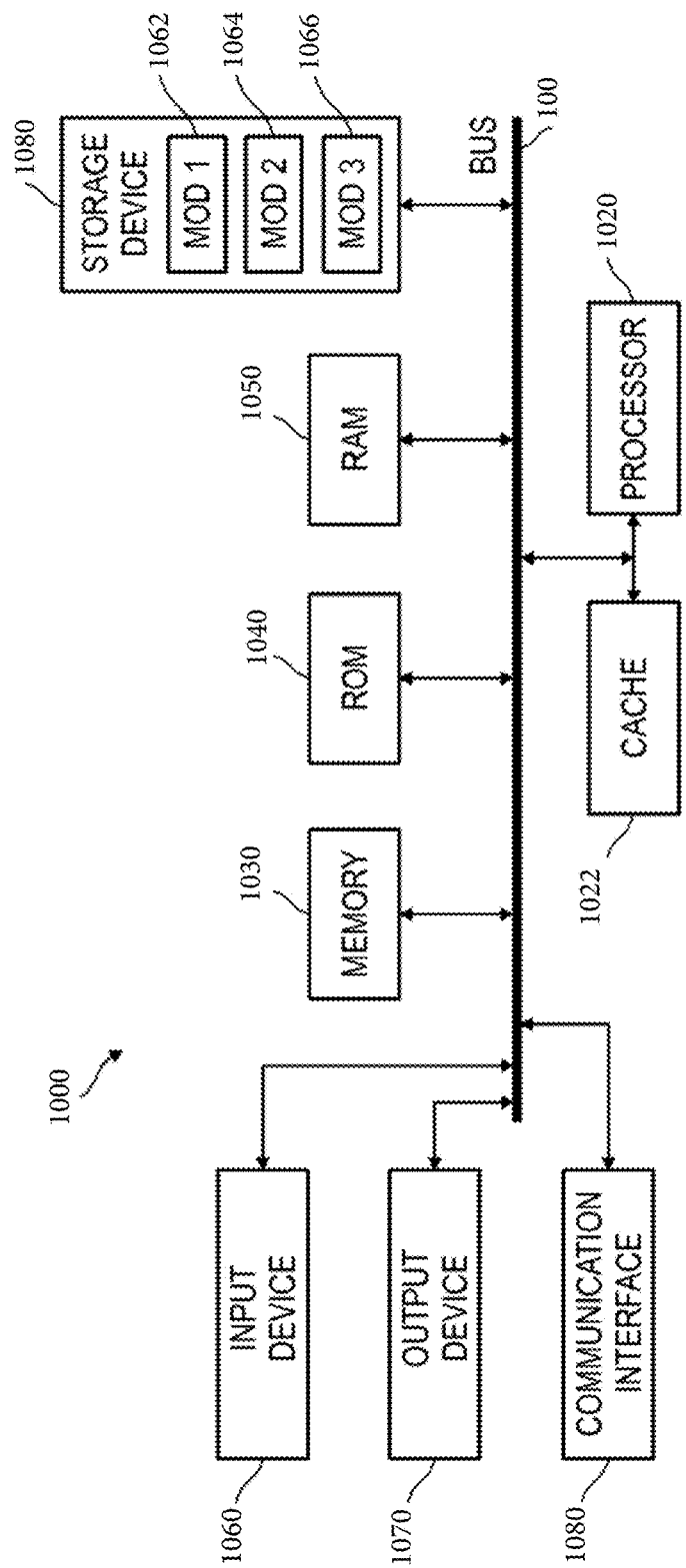
FIG. 10 illustrates an electronic device which can be employed to practice the concepts and methods of this disclosure.

FIG. 10 illustrates an electronic device 1000 (such as endpoint 10) which can be employed to practice the concepts and methods described above. The components disclosed herein can be incorporated in whole or in part into tablet computers, personal computers, handsets and other devices utilizing one or more microphones. As shown, device 1000 can include a processing unit (CPU or processor) 1020, and a system bus 100 that couples various system components including the system memory 1030 such as read only memory (ROM) 1040 and random access memory (RAM) 1050 to the processor 1020. The processor can be a digital signal processor. The device 1000 can include a cache 1022 of high speed memory connected directly with, in close proximity to, or integrated as part of the processor 1020. The device 1000 copies data from the memory 1030 and/or the storage device 1080 to the cache 1022 for quick access by the processor 1020. In this way, the cache provides a performance boost that avoids processor 1020 delays while waiting for data. These and other modules can control or be configured to control the processor 1020 to perform various actions. Other system memory 1030 may be available for use as well. The memory 1030 can include multiple different types of memory with different performance characteristics. The processor 1020 can include any general purpose processor and a hardware module or software module, such as module 1 (1062), module 2 (1064), and module 3 (1066) stored in storage device 1080, configured to control the processor 1020 as well as a special-purpose processor where software instructions are incorporated into the actual processor design. The processor 1020 may essentially be a completely self-contained computing system, containing multiple cores or processors, a bus, memory controller, cache, etc. A multi-core processor may be symmetric or asymmetric.

The system bus 100 may be any of several types of bus structures including a memory bus or memory controller, a peripheral bus, and a local bus using any of a variety of bus architectures. A basic input/output system (BIOS) stored in ROM 1040 or the like, may provide the basic routine that helps to transfer information between elements within the device 1000, such as during start-up. The device 1000 further includes storage devices 1080 such as a hard disk drive, a magnetic disk drive, an optical disk drive, tape drive or the like. The storage device 1080 can include software modules 1062, 1064, 1066 for controlling the processor 1020. Other hardware or software modules are contemplated. The storage device 1080 is connected to the system bus 100 by a drive interface. The drives and the associated computer readable storage media provide nonvolatile storage of computer readable instructions, data structures, program modules and other data for the device 1000. In one aspect, a hardware module that performs a particular function includes the software component stored in a non-transitory computer-readable medium in connection with the necessary hardware components, such as the processor 1020, bus 100, input device 1060, output device 1070, and so forth, to carry out the function. Input device 1060 can, for example, include keyboards, a mouse, and an array of microphones. Output device 1070 can, for example, include display monitors, projectors, and speakers.

For clarity of explanation, the device of FIG. 10 is presented as including individual functional blocks including functional blocks labeled as a "processor" or processor 1020. The functions these blocks represent may be provided through the use of either shared or dedicated hardware, including, but not limited to, hardware capable of executing software and hardware, such as a processor 1020, that is purpose-built to operate as an equivalent to software executing on a general purpose processor. For example the functions of one or more processors presented in FIG. 10 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1040 for storing software performing the operations discussed below, and random access memory (RAM) 1050 for storing results.

The various embodiments described above are provided by way of illustration only, and should not be construed so as to limit the scope of the disclosure. Various modifications and changes can be made to the principles and embodiments described herein without departing from the scope of the disclosure and without departing from the claims which follow.

The invention claimed is:

1. A method of displaying a split view without distortion, the method comprising:
    capturing first image data with a camera, the image data corresponding to a first image, the camera having a horizontal field of view;
    rendering the first image data to a first projection plane corresponding to a curved display surface;
    designating, in the first projection plane, a first portion of the image data corresponding to a first portion of the first image;

designating, in the projection plane, a second portion of the image data corresponding to a second portion of the first image;

mapping the first portion of the image data in the projection plane to a second projection plane;

mapping the second portion of the image data in the projection plane to a third projection plane;

rendering the mapped first portion of the image data from the second projection plane to a first portion of an electronic display; and rendering the mapped second portion of the image data from the third projection plane to a second portion of an electronic display.

2. The method of claim 1, wherein rendering the mapped first portion of the image data from the second projection plane to a first portion of an electronic display and rendering the mapped second portion of the image data from the third projection plane to a second portion of an electronic display comprises stitching the mapped first portion and mapped second portion together.

3. The method of claim 1, wherein the first portion of the image data in the first projection plane corresponds to a first zoom view of a first meeting participant, and wherein the second portion of the image data in the first projection plane corresponds to a second zoom view of a second meeting participant.

4. The method of claim 1, wherein mapping each coordinate $(x_c, y_c)$ of the first portion of the image data in first projection plane to the second projection plane and mapping each coordinate of the second portion of the image data in first projection plane to the third projection plane is done according the following relationship:

$$x_p = r * \tan\left(\frac{x_c}{r}\right)$$

and $$y_p = \frac{y_c}{\cos\left(\frac{x_c}{r}\right)}$$

wherein r is the width of the electronic display expressed in pixels divided by the horizontal field of view of the camera expressed in radians.

5. The method of claim 1, further comprising transmitting the image data in the first projection plane to remote endpoint for display at a second electronic display at a remote endpoint.

6. A videoconferencing endpoint, comprising:
a camera, the camera having a horizontal field of view;
a display device;
a processor coupled to the camera and display device;
a memory storing instructions executable by the processor, the instructions comprising instructions to:
capture first image data with the camera, the image data corresponding to a first image;
render the first image data to a first projection plane corresponding to a curved display surface;
designate, in the first projection plane, a first portion of the image data corresponding to a first portion of the first image;
designate, in the projection plane, a second portion of the image data corresponding to a second portion of the first image;
map the first portion of the image data in the projection plane to a second projection plane;

map the second portion of the image data in the projection plane to a third projection plane;

render the mapped first portion of the image data from the second projection plane to a first portion of the display device;

render the mapped second portion of the image data from the third projection plane to a second portion of the display device.

7. The videoconferencing endpoint of claim 6, wherein the instructions to render the mapped first portion of the image data from the second projection plane to a first portion of the display device and render the mapped second portion of the image data from the third projection plane to a second portion of the display device comprise instructions to stitch the mapped first portion and mapped second portion together.

8. The videoconferencing endpoint of claim 6, wherein the first portion of the image data in the first projection plane corresponds to a first zoom view of a first meeting participant, and wherein the second portion of the image data in the first projection plane corresponds to a second zoom view of a second meeting participant.

9. The videoconferencing endpoint of claim 6, wherein mapping each coordinate $(x_c, y_c)$ of the first portion of the image data in first projection plane to the second projection plane and mapping each coordinate of the second portion of the image data in first projection plane to the third projection plane is done according the following relationship:

$$x_p = r * \tan\left(\frac{x_c}{r}\right)$$

and $$y_p = \frac{y_c}{\cos\left(\frac{x_c}{r}\right)}$$

wherein r is the width of the electronic display expressed in pixels divided by the horizontal field of view of the camera expressed in radians.

10. The videoconferencing endpoint of claim 6, wherein the instructions further comprise instructions to transmit the image data in the first projection plane to remote endpoint for display at a second electronic display at a remote endpoint.

11. The videoconferencing endpoint of claim 6, wherein the camera is a panoramic camera.

12. The videoconferencing endpoint of claim 11, wherein the panoramic camera has a horizontal field of view of three hundred and sixty degrees or $2\pi$ radians.

13. The videoconferencing endpoint of claim 6, wherein the camera is a wide view camera.

14. The videoconferencing endpoint of claim 13, wherein the wide view camera has a horizontal field of view of one hundred and eighty degrees or $\pi r$ radians.

15. A non-transitory computer readable medium storing instructions executable by a processor, the instructions comprising instructions to:
capture first image data with a camera, the image data corresponding to a first image, the camera having a horizontal field of view;
render the first image data to a first projection plane corresponding to a curved display surface;
designate, in the first projection plane, a first portion of the image data corresponding to a first portion of the first image;

designate, in the projection plane, a second portion of the image data corresponding to a second portion of the first image;

map the first portion of the image data in the projection plane to a second projection plane;

map the second portion of the image data in the projection plane to a third projection plane;

render the mapped first portion of the image data from the second projection plane to a first portion of the display device;

render the mapped second portion of the image data from the third projection plane to a second portion of the display device.

16. The non-transitory computer readable medium of claim 15, wherein the instructions to render the mapped first portion of the image data from the second projection plane to a first portion of the display device and render the mapped second portion of the image data from the third projection plane to a second portion of the display device comprise instructions to stitch the mapped first portion and mapped second portion together.

17. The non-transitory computer readable medium of claim 15, wherein the first portion of the image data in the first projection plane corresponds to a first zoom view of a first meeting participant, and wherein the second portion of the image data in the first projection plane corresponds to a second zoom view of a second meeting participant.

18. The non-transitory computer readable medium of claim 15, wherein mapping each coordinate $(x_c, y_c)$ of the first portion of the image data in first projection plane to the second projection plane and mapping each coordinate of the second portion of the image data in first projection plane to the third projection plane is done according the following relationship:

$$x_p = r * \tan\left(\frac{x_c}{r}\right)$$

and $$y_p = \frac{y_c}{\cos\left(\frac{x_c}{r}\right)}$$

wherein r is the width of the electronic display expressed in pixels divided by the horizontal field of view of the camera expressed in radians.

19. The non-transitory computer readable medium of claim 15, wherein the instructions further comprise instructions to transmit the image data in the first projection plane to remote endpoint for display at a second electronic display at a remote endpoint.

* * * * *

UNITED STATES PATENT AND TRADEMARK OFFICE
CERTIFICATE OF CORRECTION

PATENT NO. : 10,194,114 B1
APPLICATION NO. : 16/016434
DATED : January 29, 2019
INVENTOR(S) : Wei-Cheng Su It is certified that error appears in the above-identified patent and that said Letters Patent is hereby corrected as shown below:

In the Claims

Column 8, Line 60 in Claim 1: Delete the word "first".

Column 8, Line 63 in Claim 1: Delete the word "first".

Column 9, Line 01 in Claim 1: Insert the word --first-- between "the" and "projection".

Column 9, Line 04 in Claim 1: Insert the word --first-- between "the" and "projection".

Column 9, Line 06 in Claim 1: Insert the word --first-- between "the" and "projection".

Column 9, Line 56 in Claim 6: Delete the word "first".

Column 9, Line 58 in Claim 6: Delete the word "first".

Column 9, Line 63 in Claim 6: Insert the word --first-- between "the" and "projection".

Column 9, Line 66 in Claim 6: Insert the word --first-- between "the" and "projection".

Column 10, Line 01 in Claim 6: Insert the word --first-- between "the" and "projection".

Column 10, Line 04 in Claim 6: Replace the word "the" with the word --a--.

Column 10, Line 60 in Claim 15: Delete the word "first".

Column 10, Line 63 in Claim 15: Delete the word "first".

Column 11, Line 01 in Claim 15: Insert the word --first-- between "the" and "projection".

Signed and Sealed this
Twenty-fifth Day of June, 2019

Andrei Iancu
*Director of the United States Patent and Trademark Office*

CERTIFICATE OF CORRECTION (continued)
U.S. Pat. No. 10,194,114 B1

Column 11, Line 04 in Claim 15: Insert the word --first-- between "the" and "projection".

Column 11, Line 06 in Claim 15: Insert the word --first-- between "the" and "projection".

Column 11, Line 09 in Claim 15: Replace the word "the" with the word --a--.